Oct. 9, 1923.
H. MILLER
LOCK FOR FILLISTER HEAD SCREWS
Filed Nov. 21, 1919
1,470,386
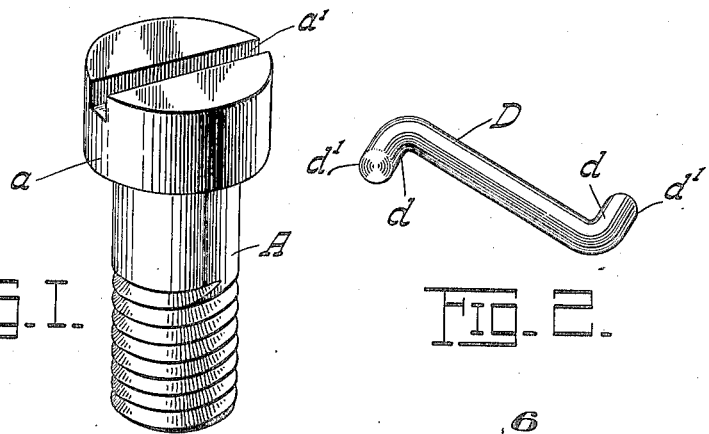
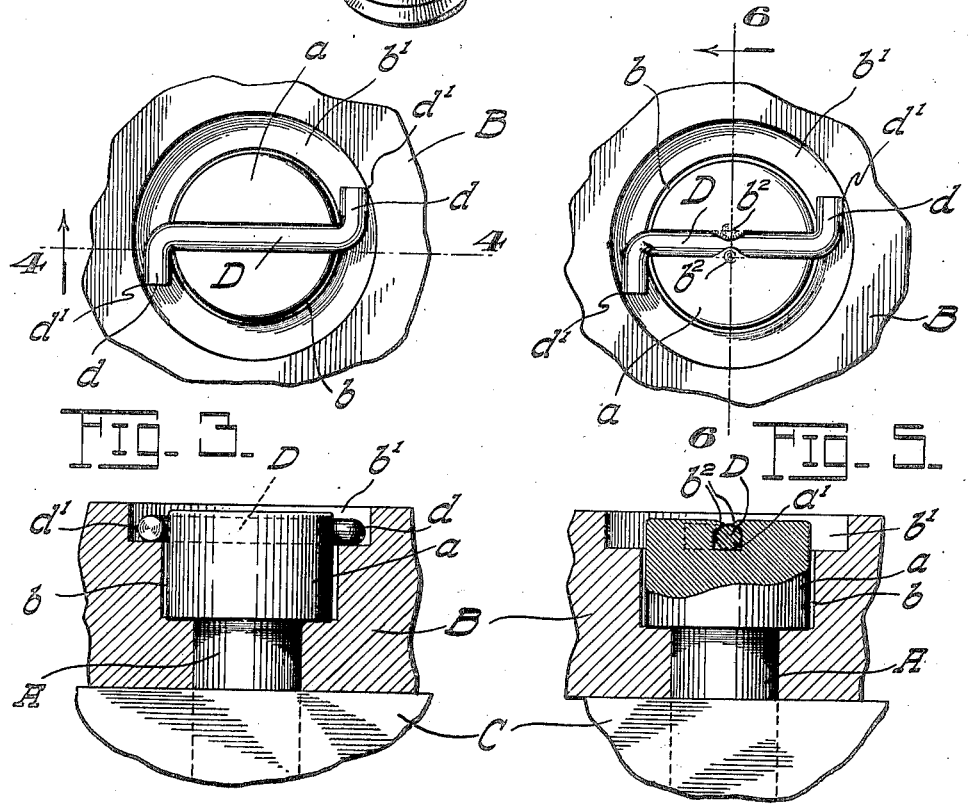
WITNESS
INVENTOR
Henry Miller
BY
ATTORNEYS Patented Oct. 9, 1923.

1,470,386

UNITED STATES PATENT OFFICE.

HENRY MILLER, OF MILWAUKEE, WISCONSIN.

LOCK FOR FILLISTER-HEAD SCREWS.

Application filed November 21, 1919. Serial No. 339,752.

*To all whom it may concern:*

Be it known that I, HENRY MILLER, a citizen of the United States, residing in the city of Milwaukee, county of Milwaukee, and State of Wisconsin, have invented a certain new and useful Improvement in Locks for Fillister-Head Screws; and I do declare the following to be a full, clear, and exact description thereof, such as will enable persons skilled in the art to which the invention pertains to make and use the same, reference being had to the accompanying drawings for disclosure as to certain details of a construction in which the invention has been embodied.

The invention relates to means for locking fillister-head screws after the latter have been set in position.

The invention comprises a locking member the shank of which is intended to be placed in the slot of a fillister-head screw, and which is provided with angular extensions the outer points of which are designed to have a biting contact with the walls of an annular recess formed in the top of plate through which the screw is inserted.

The said locking member is formed from a spring steel wire having a body sufficient to cause it to be tightly engaged in the slot in the head of the screw, so that when driven into position it cannot be removed except by a force applied for that purpose. The longest diameter of the locking device will be such as to enable the projecting points thereof to engage the side walls of the annular recess referred to, and thus resist any tendency upon the part of the screw to rotate after having once been set.

To insure the locking device being retained in position, I further close in a slight degree the open slot in the screw head in which the said member is laid, by spreading the metal of the head of the screw at each side of the slot, so that the latter will extend over the locking member, and form an additional securing means for such locking member.

In the accompanying drawings,

Figure 1 is a perspective view of an ordinary fillister-head screw, such as is used in machine assembly.

Fig. 2 is a perspective view of the locking member.

Fig. 3 is a plan view showing the head of the screw together with a portion of the plate through which the screw is passed, and showing also the locking member in position.

Fig. 4 is a sectional view on the line 4—4, Fig. 3, but showing the screw and locking member in elevation.

Fig. 5 is a plan view similar to Fig. 3, but showing the manner in which the locking member is secured in position by upsetting the metal at each side of the slot in the head of the screw; and Fig. 6 is a sectional view on the line 6—6 Fig. 5, but showing the screw partly in elevation, and showing also the manner in which the locking member is additionally secured in the slot of the head of the screw.

Like reference characters apply to the same parts in all of the figures of the drawing.

Referring to the drawings, A illustrates a fillister-head screw of common construction, the head $a$ of which is provided with a slot $a'$ of the usual formation.

The screw is employed to unite the plate B to the part C, for example, being passed through the countersunk opening $b$ in the plate B, the thread of the screw taking into the part C, all as usual. The opening $b$ is enlarged at the top of the plate B to form a concentric recess $b'$ of suitable diameter, which in the practical construction will be slightly less than the greatest diameter of the locking member previously referred to.

The locking member D shown in Fig. 2, is formed of a short section of spring steel wire, and is provided with a straight shank the length of which is equal to the diameter of the head of the screw, and with angular projections $d$ extending in opposite directions at a right angle to the axis of the shank, both of such projections lying in a substantially horizontal plane. In applying the locking device after the screw has been set in position, the shank is driven into the slot by a blow or by other pressure, and held by frictional engagement with the walls of the slot. At the same time the rounded outer ends of the projections $d$ will enable them to spring into place with their points $d'$ in tangential engagement with the side walls of the annular recess $b'$ in the plate B. The points $d'$ extend in a direction which will cause them to resist the reverse rotation of the screw, and prevent the latter from working loose. Any tendency of the screw to so rotate will cause the points $d'$, operating as pawls, to bite into the side walls of the annular recess, and act most effectively to prevent such rotation.

In its preferred form, my locking device is constructed as a Z-shaped resilient member, the diameter of the shank of which is approximately equal to the depth of the slot in the head of the screw as well as to the width of the latter. After the screw has been set in its final position, the locking member is positioned with the shank thereof in the slot of the screw and serves to substantially close for the time being the said slot. This arrangement is effective in preventing the application of any rotating means to the screw while the locking member is in position, and thus the accidental or intentional reverse rotation of the screw is prevented without first removing the locking device from the position in which it is seated. The depth of the annular recess or enlargement of the bore in the plate is substantially equal to the depth of the slot in the head of the screw. It results therefrom that when the locking member is forced into its effective position in relation to the screw by a bodily movement of the locking member to a parallel plane transverse to the axis of the screw, that the shank of the locking member will rest at the bottom of the slot formation, and the angular projections at the bottom of the annular recess. The opposite angular projections of the shank, by reason of their contact with the bottom of the recess, serve to prevent accidental movement of the locking member from its effective position, and the retention of the locking member in position is assisted by the engagement of the shank of the locking member with the parallel walls of the slot in the head of the screw. It follows that accidental displacement of the locking member is thereby guarded against, so that such locking member may be dislodged only by the presence of considerable force applied for that purpose.

In certain classes of work, in which the screw is inserted from below, for example, it may be desirable to resort to an additional means for securing the locking member in position. This provision of additionally securing the locking member is attained by upsetting and slightly spreading the metal of the head of the screw at each side of the slot, as at $b^2$, so that such metal extends partially over the locking member and narrows the slot at that point.

When it becomes necessary to adjust or remove the screw, the locking member may be easily removed by inserting a tool under the projections $d$ and forcing such member out of the slot. At such times the upset portions $b^2$ of the screw head, which have been expanded into the slot thereof, will give way under the pressure applied.

My invention provides an exceedingly simple and efficient means for attaining the results desired in connection with its use. While the invention has been devised for use in connection with certain work requiring fillister-head screws, and I have so titled the invention, it is to be understood that the invention is not to be so limited, but may be used in connection with any type of screw, bolt or nut, in which the part to be locked against reverse rotation is placed in an annular recess, the side walls of which will admit of the locking engagement described.

Having thus described my invention, what I claim and desire to secure by Letters Patent of the United States, is:

1. In a locking device for holding screws against reverse rotation, the combination of a screw having a slot in its head, and a plate provided with a countersunk hole into which the screw is passed, such hole being enlarged into an annular recess at the upper end of substantially the same depth as the slot in the head of the screw, with a locking member for the screw, such member comprising a shank to be placed in the slot of the screw and projecting portions extending in the same plane to engage the side walls of the annular recess with a biting contact.

2. In a locking device for holding screws against reverse rotation, the combination of a screw having a slot in its head, and a plate provided with a recessed opening into which the screw is passed, with a one piece locking member for the screw, such member comprising a shank adapted to be laid into the slot of the screw after the latter is set in position, and angular projections which extend in the same plane to engage the vertical side walls of the recess.

3. In a locking device for holding screws against reverse rotation, a screw having a slot in its head, a locking member having a shank, and also extensions for tangential engagement with the vertical sides of the opening into which the screw is passed, said locking member being secured in the slot by portions of the screw head spread into the slot and over the shank placed therein.

4. In a locking means for holding screws against reverse rotation, parts bored to receive the screw by means of which they are secured together, the bore being enlarged into an annular recess upon the outside of one of the said parts, and a fillister-head screw seated in the bore and uniting the parts, the slot in the said screw being of the same width from top to bottom, in combination with a one piece locking device formed as a resilient member having a shank adapted to substantially close the said slot when placed therein after the screw is set in position, and opposite angular projections at the ends of the shank having a biting engagement with the walls of the said recess.

5. In a locking means for holding screws against reverse rotation, a part bored for the reception of the screw, the said bore being enlarged into an annular recess at one side of the part, and a screw inserted in the said bore, the slot of the screw and the recess having approximately the same depth, in combination with a resilient locking member having a shank received in the slot, and angular projections extending oppositely from the ends of the shank and resting upon the bottom of said recess, with said projections in biting engagement with the side walls of the said recess.

6. In a locking means for holding screws against reverse rotation, a part bored for the reception of a slotted screw, and such screw, the said bore being enlarged at one side of the part into an annular recess of substantially the depth of the slot in the head of the screw, in combination with a locking member comprising a shank with projections extending oppositely from the ends thereof, such projections lying in the plane of the shank, whereby the said locking member may be moved bodily to a parallel plane transverse to the axis of the screw for insertion of the shank in the slot and the projections in the recess, to cause such projections to have a biting engagment with the walls of the recess.

In witness whereof, I have signed my name at Milwaukee, this 14th day of November, 1919.

HENRY MILLER.

Witnesses:
W. F. WOOLARD,
C. THEO. OSTERBERG.